United States Patent
Matsumoto et al.

(10) Patent No.: US 12,040,492 B2
(45) Date of Patent: Jul. 16, 2024

(54) ELECTRODE BINDER COMPOSITION, ELECTRODE COATING LIQUID COMPOSITION, POWER STORAGE DEVICE ELECTRODE, AND POWER STORAGE DEVICE

(71) Applicant: DKS Co. Ltd., Kyoto (JP)

(72) Inventors: Masaaki Matsumoto, Kyoto (JP); Akiyoshi Nishikawa, Kyoto (JP); Koichi Sakamoto, Kyoto (JP); Tetsuya Higashizaki, Kyoto (JP)

(73) Assignee: DKS CO. LTD., Kyoto (JP)

( * ) Notice: Subject to any disclaimer, the term of this patent is extended or adjusted under 35 U.S.C. 154(b) by 42 days.

(21) Appl. No.: 18/014,685

(22) PCT Filed: Oct. 6, 2021

(86) PCT No.: PCT/JP2021/037060
§ 371 (c)(1),
(2) Date: Jan. 5, 2023

(87) PCT Pub. No.: WO2022/085463
PCT Pub. Date: Apr. 28, 2022

(65) Prior Publication Data
US 2023/0261196 A1    Aug. 17, 2023

(30) Foreign Application Priority Data

Oct. 21, 2020   (JP) ................................. 2020-176840

(51) Int. Cl.
| | | |
|---|---|---|
| *H01B 1/24* | (2006.01) | |
| *H01G 11/38* | (2013.01) | |
| *H01M 4/62* | (2006.01) | |
| *H01G 11/06* | (2013.01) | |

(52) U.S. Cl.
CPC ............. *H01M 4/622* (2013.01); *H01B 1/24* (2013.01); *H01G 11/38* (2013.01); *H01M 4/625* (2013.01); *H01G 11/06* (2013.01)

(58) Field of Classification Search
CPC .. H01B 1/00; H01B 1/24; H01M 4/13; H01M 4/139; H01M 4/62; H01M 4/622; H01M 4/625
See application file for complete search history.

(56) References Cited

U.S. PATENT DOCUMENTS

| | | | |
|---|---|---|---|
| 8,298,676 B2 * | 10/2012 | Kato ...................... | C08J 7/042 428/425.9 |
| 10,438,752 B2 * | 10/2019 | Buffry ..................... | H01G 11/48 |
| 2007/0292622 A1 * | 12/2007 | Rowley ................. | C01B 32/174 427/407.1 |
| 2012/0112133 A1 * | 5/2012 | Bahnmuller ......... | C08G 18/664 977/932 |
| 2018/0141817 A1 * | 5/2018 | Wehnert ................ | C08J 3/05 |

FOREIGN PATENT DOCUMENTS

| | | |
|---|---|---|
| JP | 5-21068 A | 1/1993 |
| JP | 11-7948 A | 1/1999 |
| JP | 2001-210318 A | 8/2001 |

OTHER PUBLICATIONS

Tennebroek et al "Water-based polyurethane dispersion", Polym Int 2019; 68: 832-842.*
English language translation of PCT/ISA/237 (mailed Dec. 2021).*
International Search Report for PCT/JP2021/037060 mailed on Dec. 14, 2021.
Written Opinion of the International Searching Authority for PCT/JP2021/037060 mailed on Dec. 14, 2021.

* cited by examiner

*Primary Examiner* — Mark Kopec
(74) *Attorney, Agent, or Firm* — Birch, Stewart, Kolasch & Birch, LLP

(57) ABSTRACT

A technique relating to a binder having high workability while retaining binding properties is provided.

An electrode binder composition includes an aqueous polyurethane resin dispersion in which a polyurethane resin is dispersed in water, a carbon nanotube, and a surfactant. The surfactant includes at least one selected from the group consisting of nonionic surfactants, silicon-based surfactants, and fluorine-based surfactants, and a content of the surfactant is 0.1 mass % or more and 20 mass % or less relative to a total amount of the polyurethane resin, the carbon nanotube, and the surfactant.

18 Claims, No Drawings

ELECTRODE BINDER COMPOSITION, ELECTRODE COATING LIQUID COMPOSITION, POWER STORAGE DEVICE ELECTRODE, AND POWER STORAGE DEVICE

TECHNICAL FIELD

The present invention relates to an electrode binder composition, an electrode coating liquid composition, a power storage device electrode, and a power storage device.

BACKGROUND ART

It has been known that secondary batteries are used as power sources for mobile terminals such as notebook computers, mobile phones, and personal digital assistants (PDAs) (for example, PTL 1).

In PTLs 1, 2, and 3, styrene-butadiene rubber (SBR) is used as a binder used for a secondary battery electrode.

CITATION LIST

Patent Literature

PTL 1: Japanese Unexamined Patent Application Publication No. 5-21068
PTL 2: Japanese Unexamined Patent Application Publication No. 11-7948
PTL 3: Japanese Unexamined Patent Application Publication No. 2001-210318

SUMMARY OF INVENTION

Technical Problem

In general, binders used for secondary battery electrodes are required to have not only high binding properties but also high workability. Specifically, the workability is, for example, smoothness of a coating film surface and defoaming properties of a coating material. In general, the smoothness of a coating film surface and the defoaming properties of a coating material are improved by mixing a binder with a surfactant. In general, however, addition of a surfactant to a binder tends to reduce the binding properties of the binder. Thus, it has been desired to develop a technique relating to a binder having high binding properties and high workability.

Solution to Problem

The present invention has been made to solve the above problem and can be practiced in the following aspects.
(1) According to an aspect of the present invention, an electrode binder composition is provided. This electrode binder composition includes an aqueous polyurethane resin dispersion in which a polyurethane resin is dispersed in water, a carbon nanotube, and a surfactant. The surfactant includes at least one selected from the group consisting of nonionic surfactants, silicon-based surfactants, and fluorine-based surfactants. A content of the surfactant is 0.1 mass % or more and 20 mass % or less relative to a total amount of the polyurethane resin, the carbon nanotube, and the surfactant.

According to this aspect, a binder having high binding properties and high workability can be provided.

(2) In the electrode binder composition according to the above aspect, a ratio of the content of the surfactant to a content of the carbon nanotube (surfactant/carbon nanotube) may be 0.05 or more and 10 or less.

According to this aspect, a binder having high binding properties and high workability can be provided.
(3) In the electrode binder composition according to the above aspect, a ratio of the content of the surfactant to a content of the polyurethane resin (surfactant/polyurethane resin) may be 0.001 or more and 0.3 or less.

According to this aspect, a binder having high binding properties and high workability can be provided.
(4) In the electrode binder composition according to the above aspect, the surfactant may be a nonionic surfactant, and a content of the nonionic surfactant may be 0.5 mass % or more and 15 mass %, or less relative to a total amount of the polyurethane resin, the carbon nanotube, and the nonionic surfactant.

According to this aspect, a binder having high binding properties and high workability can be provided.
(5) In the electrode binder composition according to the above aspect, the surfactant may be a silicon-based surfactant, and a content of the silicon-based surfactant may be 0.5 mass % or more and 13 mass % or less relative to a total amount of the polyurethane resin, the carbon nanotube, and the silicon-based surfactant.

According to this aspect, a binder having higher binding properties while having high workability can be provided.
(6) In the electrode binder composition according to the above aspect, the surfactant may be a fluorine-based surfactant, and a content of the fluorine-based surfactant may be 0.5 mass % or more and 15 mass % or less relative to a total amount of the polyurethane resin, the carbon nanotube, and the fluorine-based surfactant.

According to this aspect, a binder having higher binding properties while having high workability can be provided.
(7) The electrode binder composition according to the above aspect may further include carboxymethylcellulose or a salt thereof.

According to this aspect, a binder having high dispersion stability can be provided.
(8) In the electrode binder composition according to the above aspect, a ratio of a content of the carbon nanotube to a content of the polyurethane resin (carbon nanotube/polyurethane resin) may be 0.001 or more and 0.2 or less.

According to this aspect, a binder having high binding properties and high workability can be provided.
(9) According to another aspect of the present invention, an electrode coating liquid composition containing the electrode binder composition according to any one of the above aspects can be provided.
(10) According to another aspect of the present invention, a power storage device electrode containing a solid of the electrode coating liquid composition according to the above aspect can be provided.
(11) According to another aspect of the present invention, a power storage device including the power storage device electrode according to the above aspect can be provided.

DESCRIPTION OF EMBODIMENTS

Hereinafter, preferred embodiments of the present invention will be described.
<Electrode Binder Composition>
An electrode binder composition according to an embodiment of the present invention includes an aqueous polyurethane resin dispersion in which a polyurethane resin is dispersed in water, a carbon nanotube, and a surfactant. The surfactant in the present embodiment includes at least one selected from the group consisting of nonionic surfactants, silicon-based surfactants, and fluorine-based surfactants. The content of the surfactant in the present embodiment is 0.1 mass % or more and 20 mass % or less relative to the total amount of the polyurethane resin, the carbon nanotube, and the surfactant.

In general, when a surfactant is added to a binder, the binding properties tend to decrease. However, according to the electrode binder composition of this embodiment, a binder having high workability while retaining binding properties can be provided by using a specific surfactant in a predetermined amount.

<Aqueous Polyurethane Resin Dispersion>

The aqueous polyurethane resin dispersion contains a polyisocyanate compound and a polyol as constituent monomers.

(Polyisocyanate Compound)

The polyisocyanate compound is not particularly limited, and examples thereof include organic polyisocyanates. Examples of organic polyisocyanates include, but are not limited to, aliphatic polyisocyanates, alicyclic polyisocyanates, aromatic polyisocyanates, and araliphatic polyisocyanates. Examples of aliphatic polyisocyanates include tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Examples of alicyclic polyisocyanates include isophorone diisocyanate, hydrogenated xylylene diisocyanate, 4,4'-dicyclohexylmethane diisocyanate, 1,4-cyclohexane diisocyanate, methylcyclohexylene diisocyanate, and 1,3-bis(isocyanatomethyl)cyclohexane. Examples of aromatic polyisocyanates include tolylene diisocyanate, 2,2'-diphenylmethane diisocyanate, 2,4'-diphenylmethane diisocyanate, 4,4'-diphenylmethane diisocyanate (MDI), 4,4'-dibenzyl diisocyanate, 1,5-naphthylene diisocyanate, xylylene diisocyanate, 1,3-phenylene diisocyanate, 1,4-phenylene diisocyanate, and hydrogenated diphenylmethane diisocyanate. Examples of araliphatic polyisocyanates include dialkyldiphenylmethane diisocyanate, tetraalkyldiphenylmethane diisocyanate, and α,α,α,α-tetramethylxylylene diisocyanate. Other examples of the polyisocyanate compound include dimers and trimers of these organic polyisocyanates and modified products such as biuret isocyanate. A single polyisocyanate compound may be used alone, or two or more polyisocyanate compounds may be used in combination.

The polyisocyanate compound is preferably an aromatic polyisocyanate or an alicyclic polyisocyanate, more preferably an alicyclic polyisocyanate. Specifically, the polyisocyanate compound is preferably 4,4'-dicyclohexylmethane diisocyanate, isophorone diisocyanate, or hydrogenated diphenylmethane diisocyanate, more preferably 4,4'-dicyclohexylmethane diisocyanate.

(Polyol)

The polyol is not particularly limited, and examples thereof include polybutadiene polyol, polyisoprene polyol, and polychloroprene polyol. Of these, polybutadiene polyol and polyisoprene polyol are preferred, and polybutadiene polyol is more preferred.

The polyol may be a polycarbonate polyol. The polycarbonate polyol is not particularly limited, and, for example, polycarbonate polyols commonly used in this technical field can be used. Examples of polycarbonate polyols include carbonate polyol of 1,6-hexanediol, carbonate polyol of 1,4-butanediol and 1,6-hexanediol, carbonate polyol of 1,5-pentanediol and 1,6-hexanediol, and carbonate polyol of 3-methyl-1,5-pentanediol and 1,6-hexanediol. More specific examples include PCDL T-6001, T-6002, T-5651, T-5652, T-5650J, T-4671, and T-4672 manufactured by Asahi Kasei Corporation; Kuraray Polyols C-590, C-1050, C-1050R, C-1090, C-2050, C-2050R, C-2070, C-2070R, C-2090, C-2090R, C-3090, C-3090R, C-4090, C-4090R, C-5090, C-5090R, C-1065N, C-2065N, C-1015N, and C-2015N manufactured by Kuraray Co., Ltd.; and ETERNACOLL (registered trademark) UH-50, UH-100, UH-200, UH-300, UM-90 (3/1), UM-90 (1/1), UM-90 (1/3), and UC-100 manufactured by Ube Industries, Ltd.

(Other Constituent Monomers)

In addition to the polyisocyanate compound and the polyol, the aqueous polyurethane resin dispersion may include, as a constituent monomer, a compound having a hydrophilic group and one or more active hydrogen groups, for example. As used herein, the term "hydrophilic group" includes anionic hydrophilic groups, cationic hydrophilic groups, and nonionic hydrophilic groups. Examples of anionic hydrophilic groups include a carboxy group and salts thereof, and a sulfonic group and salts thereof. Examples of cationic hydrophilic groups include tertiary ammonium salts and quaternary ammonium salts. Examples of nonionic hydrophilic groups include groups composed of repeating units of ethylene oxide and groups composed of repeating units of ethylene oxide and repeating units of other alkylene oxides.

Examples of compounds containing one or more active hydrogen groups and one or more carboxy groups (or salts thereof) include compounds containing carboxylic acids such as 2,2-dimethylolpropionic acid, 2,2-dimethylolbutyric acid, 2,2-dimethylolvaleric acid, dioxymaleic acid, 2,6-dioxybenzoic acid, and 3,4-diaminobenzoic acid, derivatives thereof, salts thereof, and, in addition, polyester polyols obtained using them. Other examples include amino acids such as alanine, aminobutyric acid, aminocaproic acid, glycine, glutamic acid, aspartic acid, and histidine, and carboxylic acids such as succinic acid, adipic acid, maleic anhydride, phthalic acid, and trimellitic anhydride.

Examples of compounds containing one or more active hydrogen groups and one or more sulfonic groups (or salts thereof) include compounds containing sulfonic acids such as 2-oxyethanesulfonic acid, phenolsulfonic acid, sulfobenzoic acid, sulfosuccinic acid, 5-sulfoisophthalic acid, sulfanyl acid, 1,3-phenylenediamine-4,6-disulfonic acid, and 2,4-diaminotoluene-5-sulfonic acid, derivatives thereof, and polyester polyols, polyamide polyols, and polyamide polyester polyols obtained by copolymerizing these compounds.

By neutralizing such a carboxy group or a sulfonic group to form a salt, the final polyurethane can be made water dispersible. Examples of neutralizers in this case include nonvolatile bases such as sodium hydroxide and potassium hydroxide, tertiary amines such as trimethylamine, triethylamine, dimethylethanolamine, methyldiethanolamine, and triethanolamine, and volatile bases such as ammonia. The neutralization may be performed before, during, or after urethane-forming reaction.

Examples of compounds containing one or more active hydrogen groups and a tertiary ammonium salt include methylaminoethanol and alkanolamines such as methyldiethanolamine. By neutralizing such a compound with an organic carboxylic acid such as formic acid or acetic acid or an inorganic acid such as hydrochloric acid or sulfuric acid to form a salt, the polyurethane can be made water dispersible. The neutralization may be performed before, during, or after urethane-forming reaction. Of these, from the viewpoint of ease of emulsification, it is preferable to neutralize methyldiethanolamine with an organic carboxylic acid.

Examples of compounds having one or more active hydrogen groups and a quaternary ammonium salt include compounds obtained by quaternizing the above-described methylaminoethanol or alkanolamine such as methyldiethanolamine with an alkyl halide such as methyl chloride or methyl bromide or a dialkylsulfuric acid such as dimethylsulfuric acid. Of these, from the viewpoint of ease of emulsification, a compound obtained by quaternizing methyldiethanolamine with dimethylsulfuric acid or the like is preferred.

Compounds having one or more active hydrogen groups and one or more nonionic hydrophilic groups are preferably, but not necessarily, compounds containing at least 30 mass % or more of repeating units of ethylene oxide and having number-average molecular weights of 300 to 20,000. Examples include nonionic group-containing compounds such as polyoxyethylene glycol, polyoxyethylene-polyoxypropylene copolymer glycol, polyoxyethylene-polyoxybutylene copolymer glycol, polyoxyethylene-polyoxyalkylene copolymer glycol, and monoalkyl ethers thereof, and polyester polyether polyols obtained by copolymerizing these compounds.

(Chain Extender)

Examples of chain extenders for the polyurethane resin include, but are not limited to, diamines, triamines, and tetramines. Examples of diamines include ethylenediamine, trimethylenediamine, piperazine, and isophoronediamine. Examples of triamines include diethylenetriamine and dipropylenetriamine. Examples of tetramines include triethylenetetramine. The chain extender is preferably a diamine, more preferably ethylenediamine.

The amount of chain extender is not particularly limited and is preferably 0.1 parts by mass or more and 3 parts by mass or less, more preferably 0.2 parts by mass or more and 1 part by mass or less, relative to 100 parts by mass of the polyurethane resin.

The solid content of the polyurethane resin in the aqueous polyurethane resin dispersion is not particularly limited, but from the viewpoint of workability, it is preferably 1 part by mass or more and 60 parts by mass or less, more preferably 3 parts by mass or more and 55 parts by mass or less, still more preferably 4 parts by mass or more and 50 parts by mass or less, relative to 100 parts by mass of the aqueous polyurethane resin dispersion.

<Method for Producing Aqueous Polyurethane Resin Dispersion>

The method for producing the aqueous polyurethane resin dispersion is not particularly limited, and a known method can be used. The method for producing the aqueous polyurethane resin dispersion is, for example, the following method. First, a polyisocyanate compound, a polyol, and others are reacted under reaction conditions of 30° C. to 130° C. and about 0.5 hours to 10 hours, and the reaction product is then cooled to 5° C. to 45° C. as needed to thereby obtain a urethane prepolymer. As a solvent, any organic solvent such as acetone, methyl ethyl ketone, tetrahydrofuran, dioxane, ethyl acetate, or butyl acetate can be used. Thereafter, the urethane prepolymer is emulsified and chain-extended to thereby produce the aqueous polyurethane resin dispersion. In the emulsification, water is added. The amount of water used in the emulsification is preferably 100 to 900 parts by mass relative to 100 parts by mass of the urethane prepolymer.

<Carbon Nanotube>

The carbon nanotube in the present embodiment is not particularly limited, and may be, for example, a single-walled carbon nanotube (SWCNT) or a multi-walled carbon nanotube (MWCNT). The carbon nanotube is preferably a single-walled carbon nanotube (SWCNT) because electron conductivity can be increased with a small amount.

The fiber diameter and the fiber length of the carbon nanotube are not particularly limited, but the number-average fiber diameter is preferably 0.5 nm or more and 20 nm or less, and the number-average fiber length is preferably 0.5 μm or more and 1 mm or less. When the number-average fiber diameter is 0.5 nm or more, an excessive increase in viscosity can be suppressed, thus making it easy to prepare an electrode coating composition. When the number-average fiber diameter is 20 nm or less, flexibility is improved, thus providing a battery with improved durability. The number-average fiber diameter is more preferably 1 nm or more and 10 nm or less, still more preferably 2 nm or more and 8 nm or less. When the number-average fiber length is 0.5 μm or more, an electrode with improved durability is provided, and a battery with an improved cycle life is provided. When the number-average fiber length is 1 mm or less, it is easy to control the rheology of the carbon nanotube. The number-average fiber length is more preferably 1 μm or more and 10 μm or less, still more preferably 2 μm or more and 7 μm or less. The number-average fiber length and the number-average fiber diameter can be determined by, for example, measuring the major axis and the diameter of 100 randomly selected carbon nanotubes in a transmission electron micrograph or scanning probe micrograph and calculating their number average.

The carbon nanotube is preferably used in the state of being dispersed in a predetermined medium. The dispersion of the carbon nanotube is prepared by dispersing the carbon nanotube in a medium to a nano size by a known method. Water is typically used as the medium, but a polar solvent, such as an alcohol solvent or a ketone solvent, or a mixed solvent of such a polar organic solvent and water may also be used.

Examples of usable dispersants for dispersing the carbon nanotube include celluloses such as hydroxymethylcellulose, carboxymethylcellulose, alkali metal salts thereof, methylcellulose, ethylcellulose, hydroxypropylmethylcellulose, and hydroxyethylmethylcellulose. In particular, it is more preferable to use carboxymethylcellulose or a salt thereof, and sodium salt of carboxymethylcellulose is particularly suitable for use. The electrode binder composition according to the present embodiment does not include, but may include, nanocellulose fibers.

<Surfactant>

The electrode binder composition according to the present embodiment includes a surfactant, and the surfactant in the present embodiment includes at least one selected from the group consisting of nonionic surfactants, silicon-based surfactants, and fluorine-based surfactants. The content of the surfactant is 0.1 mass % or more and 20 mass % or less relative to the total amount of the polyurethane resin, the carbon nanotube, and the surfactant.

As used herein, the term "nonionic surfactant" refers to a surfactant that does not exhibit iconicity but exhibits surface activity when dissolved in water. Examples of nonionic surfactants include, but are not limited to, acetylene glycol-based nonionic surfactants. Examples of acetylene glycol-based nonionic surfactants include SURFYNOL 420, SURFYNOL 423, SURFYNOL 424, SURFYNOL 425, SURFYNOL 440, and SURFYNOL 465 manufactured by Nissin Chemical Co., Ltd. and TRITON (registered trademark) HW-1000 manufactured by Dow Chemical Company.

When the surfactant is a nonionic surfactant, from the viewpoint of improving the binding properties, the content of the nonionic surfactant is more preferably 0.5 mass % or more and 15 mass %, or less, still more preferably 1 mass % or more and 10 mass %, or less, relative to the total amount of the polyurethane resin, the carbon nanotube, and the nonionic surfactant.

Examples of silicon-based surfactants include, but are not limited to, DOWSIL (registered trademark) FS Antifoam 92, DOWSIL (registered trademark) FS Antifoam 1277, DOWSIL (registered trademark) FS Antifoam 013A, and DOWSIL (registered trademark) 1313 Antifoam Emulsion manufactured by Dow Toray Co., Ltd. and BYK-345, BYK-346, BYK-347, BYK-348, BYK-349, BYK-3400, BYK-3410, BYK-3441, BYK-3450, BYK-3451, BYK-3480, and BYK-3481 manufactured by BYK-Chemie Japan.

When the surfactant is a silicon-based surfactant, from the viewpoint of improving the binding properties, the content of the silicon-based surfactant is more preferably 0.5 mass or more and 13 mass % or less, still more preferably 1 mass % or more and 8 mass % or less, relative to the total amount of the polyurethane resin, the carbon nanotube, and the silicon-based surfactant.

Examples of fluorine-based surfactants include, but are not limited to, FTERGENT 100 (100C), FTERGENT 150 (150CH), FTERGENT 212M, FTERGENT 251, and FTERGENT 400SW manufactured by NEOS Company Limited, SURFLON S-211, SURFLON S-221, SURFLON S-231, SURFLON S-232, and SURFLON S-233 manufactured by AGC Seimi Chemical Co., Ltd., and FC-4430 and FC-4432 manufactured by 3M.

When the surfactant is a fluorine-based surfactant, from the viewpoint of improving the binding properties, the content of the fluorine-based surfactant is more preferably 0.5 mass % or more and 15 mass % or less, still more preferably 1 mass % or more and 10 mass % or less, relative to the total amount of the polyurethane resin, the carbon nanotube, and the fluorine-based surfactant.

In the electrode binder composition according to the present embodiment, the ratio of the content of the surfactant to the content of the carbon nanotube (surfactant/carbon nanotube) is not particularly limited, and is preferably 0.05 or more and 10 or less, more preferably 0.5 or more and 8 or less, still more preferably 0.5 or more and 3 or less, particularly preferably 1 or more and 2 or less.

In the electrode binder composition according to the present embodiment, the ratio of the content of the carbon nanotube to the content of the polyurethane resin (carbon nanotube/polyurethane resin) is not particularly limited, and is preferably 0.006 or more and 0.2 or less, more preferably 0.01 or more and 0.1 or less, still more preferably 0.02 or more and 0.1 or less, particularly preferably 0.03 or more and 0.08 or less.

In the electrode binder composition according to the present embodiment, the ratio of the content of the surfactant to the content of the polyurethane resin (surfactant/polyurethane resin) is not particularly limited, and is preferably 0.001 or more and 0.3 or less, more preferably 0.01 or more and 0.15 or less, still more preferably 0.02 or more and 0.1 or less, particularly preferably 0.025 or more and 0.05 or less.

Furthermore, in the electrode binder composition according to the present embodiment, various commonly used additives can be used as necessary. Examples of such additives include, but are not limited to, weathering agents, antibacterial agents, antifungal agents, pigments, rust inhibitors, dyes, film formation aids, silane coupling agents, antiblocking agents, viscosity modifiers, leveling agents, antifoaming agents, dispersion stabilizers, light stabilizers, antioxidants, UV absorbers, inorganic fillers, organic fillers, plasticizers, lubricants, and antistatic agents.

Next, an electrode coating liquid composition according to another embodiment of the present invention will be described. The electrode coating liquid composition may contain the electrode binder composition, and an active material, a conductive aid, and a dispersant, which are described later.

In the electrode coating liquid composition, the content of the polyurethane resin is preferably 0.1 mass %, or more and 10 mass % or less relative to the solid content of the electrode coating liquid composition. When the content of the polyurethane resin is within this range, the binding properties of an electrode mixture layer and the electron conductivity of an electrode can be simultaneously achieved. The content of the carbon nanotube is preferably 0.06 mass % or more and 2 mass % or less relative to the solid content of the electrode coating liquid composition. When the content of the carbon nanotube is within this range, the rheology properties of the electrode coating liquid composition, the binding properties of an electrode mixture layer, and the electron conductivity of an electrode can be simultaneously achieved. The content of the surfactant is preferably 0.005 mass % or more and 3 mass' or less relative to the solid content of the electrode coating liquid composition. The dispersant is preferably contained in an amount of 0.4 mass % or more and 10 mass or less relative to the solid content of the electrode coating liquid composition. The active material is preferably contained in an amount of 80 mass % or more and 93 mass % or less relative to the solid content of the electrode coating liquid composition. The conductive aid is preferably contained in an amount of 0.5 mass % or more and 3 mass % or less relative to the solid content of the electrode coating liquid composition.

The dispersant is not particularly limited, and a known dispersant having a dispersion function can be used. For example, one or more selected from celluloses such as hydroxymethylcellulose, carboxymethylcellulose, alkali metal salts thereof, methylcellulose, ethylcellulose, hydroxypropylmethylcellulose, and hydroxyethylmethylcellulose; cellulose nanofibers such as chemically modified cellulose nanofibers as described in Japanese Patent No. 5626828 and Japanese Patent No. 5921960; polycarboxylic acid compounds such as polyacrylic acid and sodium polyacrylate; compounds having vinylpyrrolidone structures, such as polyvinylpyrrolidone; and polyurethane resins, polyester resins, polyacrylamide, polyethylene oxide, polyvinyl alcohol, sodium alginate, xanthan gum, carrageenan, guar gum, agar, starch, and the like may be used. In particular, carboxymethylcellulose salts are suitable for use.

As the conductive aid, an electron-conductive material that does not adversely affect the battery performance can be used. In general, carbon blacks such as acetylene black and ketjen black are used, and conductive materials such as natural graphite (e.g., scale graphite, flake graphite, and earthy graphite), artificial graphite, carbon whiskers, carbon fibers, metal (e.g., copper, nickel, aluminum, silver, and gold) powders, metal fibers, and conductive ceramic materials may also be used. These may be used alone or as a mixture of two or more. The addition amount thereof is preferably 0.1 to 30 wt %, particularly preferably 0.2 to 20 wt %, relative to the amount of active material. The carbon nanotube, which is a constituent of the electrode binder composition according to the present embodiment, also functions as a conductive aid.

For the electrode coating liquid composition of a power storage device according to the present embodiment, the method, order, etc. of mixing of the above-described electrode materials are not particularly limited. For example, the conductive aid, the dispersant, and the electrode binder composition may be mixed in advance and used. Examples of mixing and dispersing devices used for the mixing and dispersing treatment of the composition include, but are not limited to, homodispers, planetary mixers, propeller mixers, kneaders, homogenizers, ultrasonic homogenizers, colloid mills, bead mills, sand mills, and high-pressure homogenizers.

Examples of the power storage device according to the present invention include known power storage devices, and non-limiting examples thereof include lithium secondary batteries and lithium ion capacitors.

Next, a lithium secondary battery as the power storage device according to the present embodiment will be described. A positive electrode and a negative electrode used in the lithium secondary battery according to the present embodiment are each composed of an electrode active material, a conductive agent, a current collector for the electrode active material, a binder that binds the electrode active material and the conductive agent to the current collector, etc.

The lithium secondary battery according to the present embodiment includes an electrode produced using the electrode binder composition according to the above embodiment. The above-described binder can be used for both the positive electrode and the negative electrode, and is used for either the positive electrode or the negative electrode.

In the lithium secondary battery according to the present embodiment, examples of the electrode binder for which the electrode binder composition is not used include polyvinylidene fluoride; polyvinylidene fluoride copolymer resins such as copolymers of polyvinylidene fluoride and hexafluoropropylene, perfluoromethyl vinyl ether, and tetrafluoroethylene; fluorocarbon resins such as polytetrafluoroethylene and fluorocarbon rubber; and polymers such as styrene-butadiene rubber, ethylene-propylene rubber, and styrene-acrylonitrile copolymers, but are not limited thereto.

The positive electrode active material used for the positive electrode of the lithium secondary battery according to the present embodiment is not particularly limited as long as lithium ions can be intercalated and deintercalated. Examples include metal oxides such as CuO, $Cu_2O$, $MnO_2$, $MoO_3$, $V_2O_5$, $CrO_3$, $MoO_3$, $Fe_2O_3$, $Ni_2O_3$, and $CoO_3$; composite oxides of lithium and transition metals, such as $Li_xCoO_2$, $Li_xNiO_2$, $Li_xMn_2O_4$, and $LiFePO_4$; metal chalcogenides such as $TiS_2$, $MoS_2$, and $NbSe_3$; and conductive macromolecular compounds such as polyacene, poly-p-phenylene, polypyrrole, and polyaniline. Among the above, composite oxides of lithium and one or more selected from transition metals such as cobalt, nickel, and manganese, which are generally called high-voltage materials, are preferred in terms of lithium ion releasing properties and ease of generation of high voltages. Specific examples of composite oxides of lithium and cobalt, nickel, and manganese include $LiCoO_2$, $LiMnO_2$, $LiMn_2O_4$, $LiNiO_2$, $LiNi_xCo_{(1-x)}O_2$, and $LiMn_aNi_bCo_c$ (a+b+c=1). Positive electrode active materials obtained by doping these lithium composite oxides with a small amount of element such as fluorine, boron, aluminum, chromium, zirconium, molybdenum, or iron and positive electrode active materials obtained by surface treating the particle surface of the lithium composite oxides with, for example, carbon, MgO, $Al_2O_3$, or $SiO_2$ may also be used. These positive electrode active materials may also be used in combination of two or more.

The negative electrode active material used for the negative electrode in the present embodiment may be any known active material that can intercalate and deintercalate metallic lithium or lithium ions. For example, carbon materials such as natural graphite, artificial graphite, non-graphitizable carbon, and graphitizable carbon may be used. In addition, metal materials such as metallic lithium, alloys, and tin compounds, lithium transition metal nitrides, crystalline metal oxides, amorphous metal oxides, silicon compounds, conductive polymers, and the like may also be used. Specific examples include $Li_4Ti_5O_{12}$ and $NiSi_5C_6$.

In the positive electrode and the negative electrode of the lithium secondary battery according to the present embodiment, a conductive agent is used. As the conductive agent, any electron-conductive material that does not adversely affect the battery performance can be used without particular limitation. Typically, carbon blacks such as acetylene black and ketjen black are used, and conductive materials such as natural graphite (e.g., scale graphite, flake graphite, and earthy graphite), artificial graphite, carbon whiskers, carbon fibers, metal (e.g., copper, nickel, aluminum, silver, and gold) powders, metal fibers, and conductive ceramic materials may also be used. These may also be used as a mixture of two or more. The addition amount thereof is preferably 0.1 to 30 mass %, particularly preferably 0.2 to 20 mass %, relative to the amount of active material.

As the current collectors for the electrode active materials of the lithium secondary battery according to the present embodiment, any electron conductor that produces no adverse effects in an assembled battery may be used. For example, as a positive electrode current collector, aluminum, titanium, stainless steel, nickel, baked carbon, conductive polymer, conductive glass, or, alternatively, aluminum, copper, or the like surface-treated with carbon, nickel, titanium, silver, or the like for the purpose of improving adhesiveness, conductivity, and oxidation resistance may be used. As a negative electrode current collector, copper, stainless steel, nickel, aluminum, titanium, baked carbon, conductive polymer, conductive glass, Al—Cd alloy, or, alternatively, copper or the like surface-treated with carbon, nickel, titanium, silver, or the like for the purpose of improving adhesiveness, conductivity, and oxidation resistance may be used. The surface of these current collector materials may be subjected to oxidation treatment. The shape thereof may be foil-like, film-like, sheet-like, net-like, or the shape of a formed body such as a punched or expanded body, a lath body, a porous body, or a foamed body. The thickness thereof is typically, but not necessarily, 1 to 100 μm.

The electrodes of the lithium secondary battery according to the present embodiment can each be produced by mixing an electrode active material, a conductive aid, a current collector for the electrode active material, a binder that binds the electrode active material and the conductive aid to the current collector, etc. to prepare a slurry electrode material, applying the electrode material to aluminum foil, copper foil, or the like serving as the current collector, and volatilizing a dispersion medium.

In the electrode material in the present embodiment, a thickener such as a water-soluble polymer can be used as a viscosity modifier for slurrying. Specifically, one or more selected from celluloses such as carboxymethylcellulose salt, methylcellulose, ethylcellulose, hydroxymethylcellulose, hydroxypropylmethylcellulose, and hydroxyethylmethylcellulose; polycarboxylic acid compounds such as polyacrylic acid and sodium polyacrylate; compounds having vinylpyrrolidone structures, such as polyvinylpyrrolidone; and polyacrylamide, polyethylene oxide, polyvinyl alcohol, sodium alginate, xanthan gum, carrageenan, guar gum, agar, starch, and the like can be used, and, in particular, carboxymethylcellulose salt is preferred.

The method, order, etc. of mixing of the above electrode material are not particularly limited. For example, the active material and the conductive agent may be mixed in advance and used, and for the mixing in this case, a mortar, a mill mixer, a ball mill such as a planetary ball mill or a shaker ball mill, a mechanofusion, or the like may be used.

The separator used in the lithium secondary battery according to the present embodiment may be any separator used in standard lithium secondary batteries, and examples of such separators include porous resins made of polyethylene, polypropylene, polyolefin, polytetrafluoroethylene, and the like, ceramics, and nonwoven fabrics.

The electrolyte solution used in the lithium secondary battery according to the present embodiment may be any electrolyte solution used in standard lithium secondary batteries, and commonly used electrolyte solutions such as organic electrolyte solutions and ion liquids may be used.

Examples of electrolyte salts used in the lithium secondary battery according to the present embodiment include $LiPF_6$, $LiBF_4$, $LiClO_4$, $LiAsF_6$, LiCl, LiBr, $LiCF_3SO_3$, $LiN(CF_3SO_2)_2$, $LiC(CF_3SO_2)$, LiI, $LiAlCl_4$, $NaClO_4$, $NaBF_4$, and NaI, and, in particular, inorganic lithium salts such as $LiPF_E$, $LiBF_4$, $LiClO_4$, and $LiAsF_E$ and organic lithium salts represented by $LiN(SO_2C_xF_{2x+1})(SO_2C_yF_{2y+1})$ are preferred. Here, x and y each represent 0 or an integer of 1 to 4, and x+y is 2 to 8. Examples of organic lithium salts include $LiN(SO_2F)_2$, $LiN(SO_2CF_3)(SO_2C_2F_5)$, $LiN(SO_2CF_3)(SO_2C_3F_7)$, $LiN(SO_2CF_3)(SO_2C_4F_9)$, $LiN(SO_2C_2F_5)_2$, $LiN(SO_2C_2F_5)(SO_2C_3F_7)$, and $LiN(SO_2C_2F_5)(SO_2C_4F_9)$. In particular, the use of $LiPF_6$, $LiBF_4$, $LiN(CF_3SO_2)_2$, $LiN(SO_2F)_2$, or $LiN(SO_2C_2F_5)_2$ as the electrolyte advantageously provide excellent electrical properties. These electrolyte salts may be used alone or in combination of two or more. It is desired that these lithium salts be contained in the electrolyte solution at a concentration of typically 0.1 to 2.0 mol/liter, preferably 0.3 to 1.5 mol/liter.

The organic solvent for dissolving the electrolyte salt of the lithium secondary battery according to the present embodiment may be any organic solvent used in a non-aqueous electrolyte solution of a standard lithium secondary battery, and examples include carbonate compounds, lactone compounds, ether compounds, sulfolane compounds, dioxolane compounds, ketone compounds, nitrile compounds, and halogenated hydrocarbon compounds. Specific examples include carbonates such as dimethyl carbonate, methyl ethyl carbonate, diethyl carbonate, ethylene carbonate, propylene carbonate, ethylene glycol dimethyl carbonate, propylene glycol dimethyl carbonate, ethylene glycol diethyl carbonate, and vinylene carbonate; lactones such as γ-butyl lactone; ethers such as dimethoxyethane, tetrahydrofuran, 2-methyltetrahydrofuran, tetrahydropyran, and 1,4-dioxane; sulfolanes such as sulfolane and 3-methylsulfolane; dioxolanes such as 1,3-dioxolane; ketones such as 4-methyl-2-pentanone; nitriles such as acetonitrile, pyropionitrile, valeronitrile, and bensonitrile; halogenated hydrocarbons such as 1,2-dichloroethane; and other ionic liquids such as methyl formate, dimethylformamide, diethylformamide, dimethylsulfoxide, imidazolium salts, and quaternary ammonium salts. Furthermore, mixtures thereof can be used.

Of these organic solvents, in particular, one or more non-aqueous solvents selected from the group consisting of carbonates are preferably contained because high electrolyte solvency, high permittivity, and high viscosity are provided.

When a polymer electrolyte or a polymer gel electrolyte is used in the lithium secondary battery according to the present embodiment, examples of usable electrolytes include polymers and crosslinked bodies thereof, which are macromolecular compounds, having polymer or copolymer structures of ether, ester, siloxane, acrylonitrile, vinylidene fluoride, hexafluoropropylene, acrylate, methacrylate, styrene, vinyl acetate, vinyl chloride, oxetane, etc., and one kind or two or more kinds of the polymers may be used. The polymer structure is not particularly limited, and a polymer having an ether structure, such as polyethylene oxide, is particularly preferred.

In the lithium secondary battery according to the present embodiment, in the case of a liquid-type battery, an electrolyte solution is encased in a battery container; in the case of a gel-type battery, a precursor solution of a polymer dissolved in an electrolyte solution is encased in a battery container; and in the case of a solid electrolyte battery, an uncrosslinked polymer in which an electrolyte salt is dissolved is encased in a battery container.

The lithium secondary battery according to the present embodiment can be formed into any desired shape such as cylindrical, coin, prism, and other shapes. The basic configuration of the battery does not vary depending on the shape, and the design can be changed depending on the purpose. For example, a cylindrical battery is obtained as follows: a negative electrode obtained by applying a negative electrode active material to a negative electrode current collector and a positive electrode obtained by applying a positive electrode active material to a positive electrode current collector are wound with a separator interposed therebetween, the resulting wound body is encased in a battery can, a non-aqueous electrolyte solution is injected into the battery can, and the battery can is sealed with insulating plates mounted on upper and lower parts. In the case of a coin-type lithium secondary battery, a stack of a disk-like negative electrode, a separator, a disk-like positive electrode, and a stainless steel plate is encased in a coin-shaped battery can, a non-aqueous electrolyte solution is injected into the battery can, and the battery can is sealed.

EXAMPLES

The present invention will now be described in more detail with reference to Examples, but the present invention is not limited thereto.

<Preparation of Aqueous Polyurethane Resin Dispersion>
(Aqueous Polyurethane Resin Dispersion A1)

In a four-necked flask equipped with a stirrer, a reflux condenser, a thermometer, and a nitrogen inlet tube, 71.3 parts by mass of polybutadiene polyol (PolybdR-45HT manufactured by Idemitsu Kosan Co., Ltd., average hydroxyl value: 46.5 mgKOH/g, active hydrogen group number: 2.32), 4.2 parts by mass of 4,4'-dimethylolpropionic acid (active hydrogen group number: 2), 24.5 parts by mass of dicyclohexylmethane diisocyanate, and 100 parts by mass of methyl ethyl ketone were placed and then allowed to react at 75° C. for 4 hours to obtain a solution of a polyurethane prepolymer in methyl ethyl ketone. In this solution, the free isocyanate group content relative to non-volatile matter was 2.5%.

Next, the solution was cooled to 45° C. and then neutralized by adding 1.25 parts by mass of sodium hydroxide.

Thereafter, the solution was emulsified and dispersed using a homogenizer while gradually adding 300 parts by mass of water. To the resulting emulsified dispersion, an aqueous solution of 1.6 parts by mass of ethylenediamine (active hydrogen group number: 2) in 100 parts by mass of water was added, and then a chain extension reaction was performed for 1 hour. Thereafter, methyl ethyl ketone serving as a reaction solvent was distilled under reduced pressure at 50° C. to obtain an aqueous polyurethane resin dispersion A1 having a non-volatile content (solid content) of about 30 mass %.

(Aqueous Polyurethane Resin Dispersion A2)

In a four-necked flask equipped with a stirrer, a reflux condenser, a thermometer, and a nitrogen inlet tube, 34.2 parts by mass of polybutadiene polyol (PolybdR-45HT manufactured by Idemitsu Kosan Co., Ltd., average hydroxyl value: 46.5 mgKOH/g, active hydrogen group number: 2.32), 34.0 parts by mass of polycarbonate polyol (ETERNACOLL UH-100 manufactured by Ube Industries, Ltd., average hydroxyl value: 110.0 mgKOH/g, active hydrogen group number: 2.0), 4.2 parts by mass of dimethylolpropionic acid (active hydrogen group number: 2), 27.8 parts by mass of 4,4'-dicyclohexylmethane diisocyanate, and 100 parts by mass of methyl ethyl ketone were placed and then allowed to react at 75° C. for 4 hours to obtain a solution of a polyurethane prepolymer in methyl ethyl ketone. In this solution, the free isocyanate group content relative to non-volatile matter was 2.0%.

Next, the solution was cooled to 45° C. and then neutralized by adding 3.13 parts by mass of triethylamine. Thereafter, the solution was emulsified and dispersed using a homogenizer while gradually adding 300 parts by mass of water. To the resulting emulsified dispersion, an aqueous solution of 1.3 parts by mass of ethylenediamine (active hydrogen group number: 2) in 100 parts by mass of water was added, and then a chain extension reaction was performed for 1 hour. Thereafter, methyl ethyl ketone serving as a reaction solvent was distilled under reduced pressure at 50° C. to obtain an aqueous polyurethane resin dispersion A2 having a non-volatile content (solid content) of about 30 mass %.

(Aqueous Polyurethane Resin Dispersion A3)

In a four-necked flask equipped with a stirrer, a reflux condenser, a thermometer, and a nitrogen inlet tube, 51.3 parts by mass of polycarbonate polyol (ETERNACOLLUH-100 manufactured by Ube Industries, Ltd., average hydroxyl value: 110.0 mgKOH/g, active hydrogen group number: 2.0), 5.1 parts by mass of dimethylolpropionic acid (active hydrogen group number: 2), 2.6 parts by mass of trimethylolpropane (active hydrogen group number: 2), 41.0 parts by mass of 4,4'-dicyclohexylmethane diisocyanate, and 100 parts by mass of methyl ethyl ketone were placed and then allowed to react at 75° C. for 4 hours to obtain a solution of a polyurethane prepolymer in methyl ethyl ketone. In this solution, the free isocyanate group content relative to non-volatile matter was 3.01.

Next, the solution was cooled to 45° C. and then neutralized by adding 3.8 parts by mass of triethylamine. Thereafter, the solution was emulsified and dispersed using a homogenizer while gradually adding 300 parts by mass of water. To the resulting emulsified dispersion, an aqueous solution of 1.9 parts by mass of ethylenediamine (active hydrogen group number: 2) in 100 parts by mass of water was added, and then a chain extension reaction was performed for 1 hour. Thereafter, methyl ethyl ketone serving as a reaction solvent was distilled under reduced pressure at 50° C. to obtain an aqueous polyurethane resin dispersion A3 having a non-volatile content (solid content) of about 30 mass %.

<Preparation of Aqueous Carbon Nanotube Dispersion>

In a beaker, 1.0 g of a single-walled carbon nanotube (SWCNT) (TUBALL BATT manufactured by OCSiAl, CNT purity: >93%, average diameter: 1.6±0.5 nm) was mixed with 50 g of a 2 wt % aqueous solution of carboxymethylcellulose salt (CELLOGEN 7A manufactured by DKS Co., Ltd.), and the mixture was then stirred. Thereafter, using the beaker, an ultrasonic homogenizer (US-600T manufactured by Nihonseiki Kaisha Ltd.), a circulation unit, and a tube pump, the slurry was dispersed at a current of 100 μA for 90 minutes while being circulated to obtain an aqueous carbon nanotube dispersion. The carbon nanotube obtained had a number-average fiber diameter of 3 nm, a number-average fiber length of 3000 nm, and an aspect ratio of 1000.

The number-average fiber diameter and the number-average fiber length of the carbon nanotube were determined using a scanning probe microscope (SPM) (AFM-5300E manufactured by JEOL Ltd.). Specifically, the carbon nanotube was diluted with water to a solid concentration of 0.01 wt %, and then spread out on a mica substrate to evaporate the solvent. Then, an AFM image of this sample was observed, and the number-average fiber diameter and the average fiber length were determined according to the above-described method. Using these values, an aspect ratio was calculated by formula 1 below.

$$\text{Aspect ratio} = \text{average fiber length (nm)}/\text{average fiber diameter (nm)} \quad \text{(Formula 1)}$$

Method of Producing Electrode Used in Experiment (Production of Negative Electrode)

After 89 parts by mass of SiO (average particle size: 4.5 μm, specific surface area: 5.5 m$^2$/g) serving as a negative electrode active material, 2 parts of acetylene black (Li-400 manufactured by Denka Company Limited) serving as a conductive aid, 0.45 parts of carboxymethylcellulose salt (BSH-6 manufactured by DKS Co., Ltd.) serving as a dispersant, and an electrode binder were mixed, the mixture was stirred with a homodisper to prepare a negative electrode slurry (electrode coating liquid) so as to have a solid content of 40 mass %. For the adjustment of the solid content, pure water was used. The electrode coating liquid was applied onto electrolytic copper foil with a thickness of 10 μm by using a roll coater (Micro Coater manufactured by Thank-Metal Co., Ltd.), dried at 120° C., and then roll-pressed to obtain a negative electrode with a negative electrode active material weight of 7 to 8 mg/cm$^2$.

In Example 1, 9 parts by mass of the aqueous polyurethane resin dispersion A1, 0.2 parts by mass of a carbon nanotube, and 0.3 parts by mass of SURFYNOL 420 (manufactured by Nissin Chemical Co., Ltd.) serving as a nonionic surfactant were used as electrode binder.

Examples 2 to 10 and Comparative Examples 1 and 2

Negative electrodes were produced in the same manner as in Example 1 except that the composition was changed as shown in the table given below. In Examples 2, 3, and 6, graphite (average particle size: 18 μm, specific surface area: 3.2 m$^2$/g) was further used as a negative electrode active material in addition to SiO.

Workability Evaluation
(Coating Film Surface Smoothness)

Using a light microscope, coating film surfaces of the electrodes obtained above were visually observed. The coating film surface smoothness was evaluated by the number of pinholes per 1 m$^2$ of a coating film surface. Hereinafter, a negative electrode was used as an electrode. The smaller the number of pinholes, the higher the coating film surface smoothness.

Evaluation Criteria
Score 5: Less than 1 pinhole/1 m$^2$
Score 4: 1 or more and less than 5 pinholes/1 m$^2$
Score 3: 5 or more and less than 20 pinholes/1 m$^2$
Score 2: 20 or more and less than 100 pinholes/1 m$^2$
Score 1: 100 or more pinholes/1 m$^2$ (Coating Material Defoaming Properties)

Defoaming was performed by reducing the pressure while stirring the negative electrode slurry (electrode coating liquid) with a planetary mixer. The time until the foam was disappeared by the decompression was visually confirmed. The shorter the time until the foam disappeared, the higher the coating material defoaming properties.

Evaluation Criteria
Score 5: Defoamed in less than 30 minutes
Score 4: Defoamed in 30 minutes or more and less than 1 hour
Score 3: Defoamed in 1 hour or more and less than 3 hours
Score 2: Defoamed in 3 hours or more and less than 5 hours
Score 1: Not defoamed in 5 hours <Evaluation of Binding Properties>

With the coating film surface of each electrode obtained above facing outward, the electrode was bent by 180° and unbent, after which the degree of falling off of the active material on the coating film surface was judged by visual observation. The less the falling off of the active material, the higher the binding properties.

Evaluation Criteria:
Score 5: No falling off
Score 4: More than 0% and 25% or less fell off
Score 3: More than 25% and 50% or less fell off
Score 2: More than 50% and 75% or less fell off
Score 1: More than 75% fell off The experimental results are shown below.

TABLE 1

| | | Example 1 | Example 2 | Example 3 | Example 4 | Example 5 | Example 6 |
|---|---|---|---|---|---|---|---|
| (A) | Polyurethane resin A1 | 9 | 6 | 2.5 | 9 | 9 | 6 |
| | Polyurethane resin A2 | | | | | | |
| | Polyurethane resin A3 | | | | | | |
| (B) | Carbon nanotube | 0.2 | 0.2 | 0.2 | 0.2 | 0.2 | 0.2 |
| (C) | Surfactant (type) | SURFYNOL 420 | SURFYNOL 420 | SURFYNOL 420 | SURFYNOL 420 | SURFYNOL 420 | SURFYNOL 420 |
| | Surfactant (amount) | 0.3 | 0.3 | 0.3 | 0.01 | 1 | 1 |
| | Dispersant | 0.45 | 0.45 | 0.45 | 0.45 | 0.45 | 0.45 |
| | Negative electrode active material SiO | 89 | 53.4 | 17.8 | 89 | 89 | 53.4 |
| | Negative electrode active material, graphite | 0 | 35.6 | 71.2 | 0 | 0 | 35.6 |
| | Conductive aid | 2 | 2 | 2 | 2 | 2 | 2 |
| | Total (all components) | 100.65 | 97.65 | 94.15 | 100.65 | 100.65 | 97.65 |
| | Total {(A) + (B) + (C)} | 9.5 | 6.5 | 3 | 9.21 | 10.2 | 7.2 |
| | (C) content (all components) | 0.30 | 0.31 | 0.32 | 0.01 | 0.99 | 1.02 |
| | (C)/{(A) + (B) + (C)} [%] | 3.16 | 4.62 | 10.00 | 0.11 | 9.80 | 13.89 |
| | (B)/(A) | 0.02 | 0.03 | 0.08 | 0.02 | 0.02 | 0.03 |
| | (C)/(B) | 1.5 | 1.5 | 1.5 | 0.05 | 5 | 5 |
| | (C)/(A) | 0.033 | 0.050 | 0.120 | 0.001 | 0.111 | 0.167 |
| Evaluation | Coating film surface smoothness | 5 | 5 | 5 | 4 | 5 | 5 |
| | Coating material defoaming properties | 5 | 5 | 5 | 4 | 5 | 5 |
| | Binding properties | 4 | 4 | 4 | 4 | 4 | 4 |

| | | Example 7 | Example 8 | Example 9 | Example 10 | Comparative Example 1 | Comparative Example 2 |
|---|---|---|---|---|---|---|---|
| (A) | Polyurethane resin A1 | 9 | 9 | | | 9 | 9 |
| | Polyurethane resin A2 | | | 9 | | | |
| | Polyurethane resin A3 | | | | 9 | | |
| (B) | Carbon nanotube | 0.2 | 0.2 | 0.2 | 0.2 | 0.2 | 0.2 |
| (C) | Surfactant (type) | BYK-349 | FTERGENT 100 | SURFYNOL 420 | SURFYNOL 420 | — | SURFYNOL 420 |
| | Surfactant (amount) | 0.3 | 0.3 | 0.3 | 0.3 | 0 | 3 |
| | Dispersant | 0.45 | 0.45 | 0.45 | 0.45 | 0.45 | 0.45 |
| | Negative electrode active material SiO | 89 | 89 | 89 | 89 | 89 | 89 |
| | Negative electrode active material, graphite | 0 | 0 | 0 | 0 | 0 | 0 |
| | Conductive aid | 2 | 2 | 2 | 2 | 2 | 2 |
| | Total (all components) | 100.65 | 100.65 | 100.65 | 100.65 | 100.65 | 100.65 |
| | Total {(A) + (B) + (C)} | 9.5 | 9.5 | 9.5 | 9.5 | 9.2 | 12.2 |

TABLE 1-continued

|  |  |  |  |  |  |  |  |
|---|---|---|---|---|---|---|---|
|  | (C) content (all components) | 0.30 | 0.30 | 0.30 | 0.30 | 0.00 | 2.98 |
|  | (C)/{(A) + (B) + (C)} [%] | 3.16 | 3.16 | 3.16 | 3.16 | 0.00 | 24.59 |
|  | (B)/(A) | 0.02 | 0.02 | 0.02 | 0.02 | 0.02 | 0.02 |
|  | (C)/(B) | 1.5 | 1.5 | 1.5 | 1.5 | 0 | 15 |
|  | (C)/(A) | 0.033 | 0.033 | 0.033 | 0.033 | 0.000 | 0.333 |
| Evaluation | Coating film surface smoothness | 5 | 4 | 5 | 5 | 2 | 5 |
|  | Coating material defoaming properties | 4 | 4 | 5 | 5 | 2 | 5 |
|  | Binding properties | 5 | 4 | 5 | 4 | 4 | 1 |

Comparison of Examples 1 to 10 with Comparative Example 1 has revealed that the use of a surfactant in the present embodiment provides high workability while maintaining binding properties. Comparison of Examples 1 to 10 with Comparative Example 2 has revealed that a surfactant content of 20 mass % or less relative to the total amount of polyurethane resin, carbon nanotube, and surfactant provides high workability while maintaining binding properties.

INDUSTRIAL APPLICABILITY

The electrode binder composition according to the present embodiment can be used as a binder for an electrode of a power storage device (e.g., a lithium secondary battery electrode), and an electrode using this binder is used in the production of various power storage devices. That is, an electrode coating liquid composition containing the electrode binder composition according to the present embodiment can be produced, and a power storage device including an electrode containing a solid of the electrode coating liquid is provided. The power storage device provided can be used for various portable devices such as mobile phones, notebook computers, personal digital assistants (PDAs), video cameras, and digital cameras and, furthermore, can be used as medium-sized and large-sized power storage devices mounted in power-assisted bicycles, electric vehicles, and the like.

The present invention is not limited to the above-described embodiments and can be practiced in various configurations without departing from the spirit of the invention. For example, the technical features in the embodiments and examples corresponding to the technical features in the aspects described in the section of Summary of Invention can be appropriately exchanged or combined in order to partially or completely solve the above-described problem or to partially or fully achieve the above-described effects. Any of the technical features can be appropriately omitted unless it is described as essential in this specification.

The invention claimed is:

1. An electrode binder composition comprising:
    an aqueous polyurethane resin dispersion in which a polyurethane resin is dispersed in water;
    a carbon nanotube; and
    a surfactant,
    wherein the surfactant includes at least one selected from the group consisting of nonionic surfactants, silicon-based surfactants, and fluorine-based surfactants, and
    a content of the surfactant is 0.1 mass % or more and 20 mass % or less relative to a total amount of the polyurethane resin, the carbon nanotube, and the surfactant.

2. The electrode binder composition according to claim 1, wherein a ratio of the content of the surfactant to a content of the carbon nanotube (surfactant/carbon nanotube) is 0.05 or more and 10 or less.

3. The electrode binder composition according to claim 1, wherein a ratio of the content of the surfactant to a content of the polyurethane resin (surfactant/polyurethane resin) is 0.001 or more and 0.3 or less.

4. The electrode binder composition according to claim 1, wherein the surfactant is a nonionic surfactant, and
    a content of the nonionic surfactant is 0.5 mass % or more and 15 mass % or less relative to a total amount of the polyurethane resin, the carbon nanotube, and the nonionic surfactant.

5. The electrode binder composition according to claim 1, wherein the surfactant is a silicon-based surfactant, and
    a content of the silicon-based surfactant is 0.5 mass % or more and 13 mass % or less relative to a total amount of the polyurethane resin, the carbon nanotube, and the silicon-based surfactant.

6. The electrode binder composition according to claim 1, wherein the surfactant is a fluorine-based surfactant, and
    a content of the fluorine-based surfactant is 0.5 mass % or more and 15 mass % or less relative to a total amount of the polyurethane resin, the carbon nanotube, and the fluorine-based surfactant.

7. The electrode binder composition according to claim 1, further comprising carboxymethylcellulose or a salt thereof.

8. The electrode binder composition according to claim 1, wherein a ratio of a content of the carbon nanotube to a content of the polyurethane resin (carbon nanotube/polyurethane resin) is 0.001 or more and 0.2 or less.

9. An electrode coating liquid composition comprising the electrode binder composition according to claim 1.

10. A power storage device electrode comprising a solid of the electrode coating liquid composition according to claim 9.

11. A power storage device comprising the power storage device electrode according to claim 10.

12. The power storage device according to claim 11, wherein a ratio of the content of the surfactant to a content of the carbon nanotube (surfactant/carbon nanotube) is 0.05 or more and 10 or less.

13. The power storage device according to claim 11, wherein a ratio of the content of the surfactant to a content of the polyurethane resin (surfactant/polyurethane resin) is 0.001 or more and 0.3 or less.

14. The power storage device according to claim 11, wherein the surfactant is a nonionic surfactant, and
    a content of the nonionic surfactant is 0.5 mass % or more and 15 mass % or less relative to a total amount of the polyurethane resin, the carbon nanotube, and the nonionic surfactant.

15. The power storage device according to claim 11,
wherein the surfactant is a silicon-based surfactant, and
a content of the silicon-based surfactant is 0.5 mass % or more and 13 mass % or less relative to a total amount of the polyurethane resin, the carbon nanotube, and the silicon-based surfactant.

16. The power storage device according to claim 11,
wherein the surfactant is a fluorine-based surfactant, and
a content of the fluorine-based surfactant is 0.5 mass % or more and 15 mass % or less relative to a total amount of the polyurethane resin, the carbon nanotube, and the fluorine-based surfactant.

17. The power storage device according to claim 11,
further comprising carboxymethylcellulose or a salt thereof.

18. The power storage device according to claim 11,
wherein a ratio of a content of the carbon nanotube to a content of the polyurethane resin (carbon nanotube/polyurethane resin) is 0.001 or more and 0.2 or less.

* * * * *